Patented Dec. 21, 1926.

1,611,436

UNITED STATES PATENT OFFICE.

CHARLES P. HALL, OF AKRON, OHIO.

PROCESS OF SOFTENING RUBBER.

No Drawing. Application filed July 23, 1925. Serial No. 45,712.

This invention relates to a new and improved process of softening rubber, the object of the invention being to improve upon existing methods and products as will be explained herein.

In the preparation of rubber stocks, it is customary to use certain softening agents which improve the milling of the rubber and impart certain beneficial qualities to the vulcanized product. A number of these softening agents have been employed and suggested. Perhaps the most widely used and satisfactory substance known prior to my invention is pine tar which has many valuable properties, but also possesses certain well known disadvantages.

I have made a very considerable study of various softening agents and their properties, with a view to improving upon pine tar or any other agent for this purpose, and, as a result, I have found that a certain asphalt residue of the cracking still obtained in the cracking of crude petroleum in a certain manner, possesses properties superior to those of any softening agent heretofore known.

Such product is derived by the removal by distillation, preferably with steam, of lighter portions of "tar" or residue resulting from the cracking or conversion under pressure of hydrocarbon oils heavier than gasoline into gasoline; for example, a product such as that described in the Burton Patent No. 1,553,847, granted September 15, 1925.

The substance referred to possesses many advantages over other softeners, asphalts or petroleum residues. It is a syrupy liquid having approximately the consistency of molasses. It softens the stock and renders it more plastic than an equivalent weight of pine tar, thus shortening the time of milling. Taking 100% as a standard of softening with pine tar, the material herein contemplated will give a plasticity of 115% as compared with approximately 83% for mineral rubbers. No odors or other physical inconveniences occur in the milling of the rubber, and it posseses many other advantages.

The substances referred to has the following analysis:

Soluble in $CS_2$, % not less than 99.
Soluble in $CCl_4$, % not less than 98.
Soluble in hexane, % not less than 75.
Spec. gravity at 60° F. not less than 1.06.
Spec. gravity at 77° F. not less than 1.05.
Fixed carbon, % less more than 14.
Flash test (ASTM), ° F. not more than 375.
Paraffin scale, % not more than 2.
Visc. at 212° F. (Engler) 5 to 7.
Visc. at 212° F. (Saybold universal) 180 to 250.
Loss on evaporation, 50 grams, at 325° F. for 5 hr. % not over 3.0.

When evaporated at a temperature not exceeding 500° F. until the residue has a penetration of 100 at 77° F., the percent of such residue shall not be less than 75, and it shall have a ductility at 77° F. of not less than 100 cm., when tested in a standard ductility machine using the Dow mold, the rate of elongation being 60 cm. per minute.

In mixing it with rubber, it is added to the batch upon the mill and may be used with any usual or preferred ingredients and in any suitable proportion. The material may be compounded, for example, with rubber, zinc oxide, carbon black, or other pigment, sulphur and an accelerator, and the resulting vulcanized compound will have superior abrasion resisting properties, greater elongation and superior tensile strength over compounds using mineral or vegetable softeners. By the use of the material, the time for curing a non-blooming stock will be lowered and a more uniform tensile strength will be obtained over a longer period of cure. It gives superior aging characteristics than those obtained by the use of mineral or vegetable oils as softeners and reduces the impairment and loss of tensile strength due to the oxidization and to the presence of active accelerating mediums in the rubber. The resulting compound is particularly adaptable for use as a tread stock for pneumatic tires, although its use is not necessarily so restricted.

It has been found that by the use of this material in the compounding of rubber the various advantageous results set forth and others are obtained.

What I desire to claim is:

The process of softening rubber for milling and compounding which comprises adding to the rubber a softening agent having the following analysis: soluble in $CS_2$, % not less than 99; soluble in $CCl_4$, % not less than 98; soluble in hexane, % not less than 75; spec. gravity at 60° F. not less than 1.06; spec. gravity at 77° F. not less than 1.05; fixed carbon, % not more than 14; flash test (ASTM), deg. F. not more than 375; paraffin scale, % not more than 2; visc. at 212° F. (Engler) 5 to 7; visc. at 212° F. (Saybolt universal) 180 to 250; loss on evaporation, 50 grams, at 325° F. for 5 hr. % not over 3.0.

CHARLES P. HALL.